(12) United States Patent
Maple et al.

(10) Patent No.: US 7,042,667 B2
(45) Date of Patent: May 9, 2006

(54) DATA STORAGE

(75) Inventors: Catharine Anne Maple, Bristol (GB); Jonathan Peter Buckingham, Bristol (GB)

(73) Assignee: Hewlett-Packard Development Company, L.P.

( * ) Notice: Subject to any disclaimer, the term of this patent is extended or adjusted under 35 U.S.C. 154(b) by 442 days.

(21) Appl. No.: 09/917,952

(22) Filed: Jul. 31, 2001

(65) Prior Publication Data

US 2003/0030931 A1    Feb. 13, 2003

(51) Int. Cl.
G11B 5/09    (2006.01)

(52) U.S. Cl. .......................... 360/51; 360/48
(58) Field of Classification Search ............ 360/51, 360/53, 48; 341/59
See application file for complete search history.

(56) References Cited

U.S. PATENT DOCUMENTS

| | | | |
|---|---|---|---|
| 3,641,534 A * | 2/1972 | Irwin ............................ 360/51 |
| 3,893,072 A * | 7/1975 | D'Antonio et al. .......... 714/751 |
| 4,001,883 A | 1/1977 | Strout et al. |
| 4,390,909 A | 6/1983 | Sakamoto |
| 4,559,568 A | 12/1985 | Watanabe et al. |
| 4,604,657 A | 8/1986 | Fukami et al. |
| 4,700,240 A | 10/1987 | Umemoto et al. |
| 4,829,525 A | 5/1989 | Sugiyama et al. |
| 4,835,628 A * | 5/1989 | Hinz et al. ..................... 360/48 |
| 4,862,295 A * | 8/1989 | Tanaka et al. ................. 360/48 |
| 4,862,443 A * | 8/1989 | Tsuji et al. ............... 369/59.25 |
| 5,012,459 A | 4/1991 | Odaka et al. |
| 5,293,285 A | 3/1994 | Leonhardt et al. |
| 5,339,108 A | 8/1994 | Coleman et al. |
| 5,353,175 A | 10/1994 | Chiba |
| 5,369,652 A | 11/1994 | Bailey et al. |
| 5,371,745 A | 12/1994 | Kiyonaga et al. |
| 5,384,669 A | 1/1995 | Dunn et al. |
| 5,396,374 A | 3/1995 | Kubota et al. |
| 5,408,366 A | 4/1995 | Bentley et al. |
| 5,416,782 A | 5/1995 | Wells et al. |
| 5,434,719 A | 7/1995 | Miller et al. |
| 5,446,604 A | 8/1995 | Chiba |
| 5,450,250 A | 9/1995 | Garcia et al. |
| 5,465,159 A | 11/1995 | Ohashi |

(Continued)

FOREIGN PATENT DOCUMENTS

EP    0286412    10/1988

(Continued)

OTHER PUBLICATIONS

"Construction of Error Resilient Synchronization Codeword for Variable-Length Code in Image Transmission," Department of Electronics Engineering, by Yew-San et al., 2000, IEEE, pp. 360-363.

(Continued)

*Primary Examiner*—David Hudspeth
*Assistant Examiner*—Dan I Davidson

(57) ABSTRACT

A data reader is arranged to read data from a data-holding medium, said data being arranged into a plurality of data items each containing user data and non-user data, with said non-user data including one or more synchronisation fields. The data reader has a read head for reading a channel of said data-holding medium to generate a data signal comprising said data items, and processing circuitry arranged to receive and process said data signals to detect synchronisation fields, including qualifying the detection of the synchronisation fields to tolerate one or more errors in those synchronisation fields. This means that the synchronisation fields can be detected more reliably, so that more of the user data is recovered.

27 Claims, 6 Drawing Sheets

U.S. PATENT DOCUMENTS

| | | | | |
|---|---|---|---|---|
| 5,467,360 | A | 11/1995 | Lokhoff | |
| 5,485,321 | A | 1/1996 | Leonhardt et al. | |
| 5,485,476 | A * | 1/1996 | Paranjape et al. | 714/798 |
| 5,491,590 | A | 2/1996 | Endo et al. | |
| 5,543,977 | A | 8/1996 | Shih et al. | |
| 5,576,903 | A | 11/1996 | Brown et al. | |
| 5,589,995 | A * | 12/1996 | Saito et al. | 360/48 |
| 5,633,855 | A | 5/1997 | Naito | |
| 5,675,447 | A * | 10/1997 | Goker et al. | 360/48 |
| 5,719,717 | A | 2/1998 | Leonhardt et al. | |
| 5,729,408 | A | 3/1998 | Kikitsu | |
| 5,731,922 | A | 3/1998 | Yamasaki et al. | |
| 5,818,654 | A | 10/1998 | Reddy et al. | |
| 5,844,920 | A * | 12/1998 | Zook et al. | 714/769 |
| 5,847,890 | A * | 12/1998 | Hattori | 360/51 |
| 5,905,600 | A | 5/1999 | Nieuwkerk | |
| 5,940,233 | A * | 8/1999 | Malone, Sr. | 360/51 |
| 5,969,649 | A * | 10/1999 | Ashley et al. | 341/59 |
| 5,974,581 | A | 10/1999 | Nagai et al. | |
| 5,999,110 | A * | 12/1999 | Blaum et al. | 341/59 |
| 6,018,434 | A | 1/2000 | Saliba | |
| 6,049,654 | A | 4/2000 | Furuta et al. | |
| 6,092,231 | A | 7/2000 | Sze | |
| 6,282,040 | B1 | 8/2001 | Bartlett | |
| 6,288,862 | B1 | 9/2001 | Baron et al. | |
| 6,367,047 | B1 | 4/2002 | McAuliffe et al. | |
| 6,469,854 | B1 | 10/2002 | Gill et al. | |
| 6,473,561 | B1 | 10/2002 | Heo | |
| 6,522,831 | B1 | 2/2003 | Tanaka et al. | |
| 6,532,128 | B1 | 3/2003 | Bui et al. | |
| 6,539,514 | B1 | 3/2003 | Bartlett | |
| 6,581,184 | B1 | 6/2003 | Saeki et al. | |
| 6,584,527 | B1 | 6/2003 | Verinsky et al. | |
| 6,640,326 | B1 * | 10/2003 | Buckingham et al. | 714/769 |
| 6,650,495 | B1 | 11/2003 | Gill et al. | |
| 6,707,626 | B1 * | 3/2004 | Esumi | 360/51 |

FOREIGN PATENT DOCUMENTS

| | | |
|---|---|---|
| EP | 0624875 | 11/1994 |
| EP | 0831482 | 3/1998 |
| EP | 0913826 | 5/1999 |
| EP | 0936618 | 8/1999 |
| EP | 0944199 | 9/1999 |
| EP | 0957484 | 11/1999 |
| EP | 0984451 | 3/2000 |
| WO | 97/04454 | 2/1997 |
| WO | 99/50850 | 10/1999 |

OTHER PUBLICATIONS

"New 8 mm Is Ideal for Automated Storage," J. Gast, *Computer Technology Review* Mar. 11, 1991 No. 3, pp. 26, 28-29.

* cited by examiner

DATA STORAGE

FIELD OF THE INVENTION

This invention relates to a method for improved data storage and to an improved data storage device, which may be a tape drive arranged to receive data from a computer or the like.

BACKGROUND OF THE INVENTION

Tape drives may be used to receive user data from for example, computers and to store such data on tapes. The tapes may store a back-up copy of the user data, that will be required if the original has been lost or damaged. In such back-up applications it is of prime importance that the user data is retrievable. Therefore, there is an ongoing need to ensure that data storage devices such as tape drives and data-holding media such as tapes are as robust and secure as possible.

Once user data has been stored on the data-holding medium it can be held there for long periods. To recover the user data from the data-holding medium the data storage device must read the data-holding medium and regenerate the user data originally stored there. The data is normally split into discrete data items, each item including some user data and non-user data such as correction information, header information and information denoting the start and end of each data item The latter are called synchronisation fields or syncs. Sync detection is critical for reliable reading of the data from the data-holding medium. Various problems may occur in sync detection. For example, a sync may contain an error which results in it not being recognised, or spurious syncs may occur in the user data. To account for these, interpolation from a previously detected perfect sync has been used but this in itself has associated problems. It is an object of the present invention to provide a method and apparatus for improved sync detection.

SUMMARY OF THE INVENTION

According to a first aspect of the invention, we provide a method of reading data written on a data-holding medium using a data reader, said data being arranged into a plurality of data items each containing user data and non-user data, with said non-user data including one or more synchronisation fields, said method comprising:
  reading data from the data-holding medium; and
  processing said data to detect at least one synchronisation field, said processing involving qualifying the detection of the synchronisation field to tolerate one or more errors therein.

Sync detection is therefore qualified to overcome the problems described above, providing error tolerance in sync detection.

Sync detection may be qualified by determining a part of the sync to be detected. Thus, parts of the sync may be ignored (usually the beginning or the end), and/or parts of contiguous data may be included for detection. The data to be detected will hereinafter be called a "sync pattern".

The sync pattern detection may be qualified by determining that the sync must be preceded by a predetermined pattern of data, such that sync detection is only enabled when the predetermined pattern of data is detected. The detection of the predetermined pattern of data occurring at any point in the reading of the data is accepted and sync detection enabled. The detection of the predetermined pattern of data may be strict, i.e. no errors in the detection thereof are tolerated. The detection of the predetermined pattern of data may comprise reading data from the data-holding medium, passing this data into a shift register, and comparing the contents of the shift register with an ideal predetermined pattern of data to determine if the data comprises the predetermined pattern of data. The predetermined pattern of data preferably immediately precedes the sync pattern The predetermined pattern of data may be at least part of a VFO signal.

Additionally or alternatively, sync pattern detection may be qualified by splitting the sync pattern into two or more portions or sync bytes, and determining that detection of one or more of the sync bytes constitutes detection of the sync. Ion this way, one or more errors in the sync pattern may be tolerated Splitting of the sync pattern into sync bytes is preferably chosen such that the possibility of bit shift affecting each of the sync bytes is avoided. The sync bytes may be configurable, for example using one or more registers. The sync bytes may overlap. The sync bytes may be adjacent, or may not be adjacent. The sync bytes may be interleaved. Preferably, the sync pattern is split into two sync bytes, the first sync byte comprising substantially a first portion of the sync pattern, and the second sync byte comprising the remainder of the sync pattern. The detection of each sync byte is preferably carried out using one or more mask registers. The contents of the or each mask may be programmable, for example by firmware of the data reader. The detection of each sync byte may comprise reading data from the data-holding medium into a register, ANDing the contents of the register with the contents of each mask register, comparing the result thereof to the AND of the contents of each mask register and a register containing an ideal sync byte pattern. Each bit in each mask register preferably corresponds to a bit in the data, and determines whether or not that bit of data is compared with the ideal sync. A '1' in a mask register may indicate that the corresponding bit in the data will be compared with the ideal sync. The detection of each sync byte may be carried out continuously, and once one or more of the sync bytes are detected, this constitutes detection of the sync pattern.

Additionally or alternatively, sync pattern detection may be qualified by using a window and determining that any sync pattern or sync byte detected whilst the window is open is considered as a true sync or sync byte, and any sync pattern or sync byte detected whilst the window is closed is considered a spurious sync pattern or sync byte, for example generated by errors in the data. Qualification of the sync pattern detection by using a window may allow for any bit slip which occurs in the data. The window may be opened at a predetermined point. The window may be closed at a predetermined point after the point at which it is opened. For example, the sync pattern or sync byte may be expected to occur at a calculable point in the data and may be expected to be of a calculable length. The window may be opened at this point and closed at a predetermined number of bits thereafter. The point at which the window is opened may be variable, The point at which the window is opened may be configurable, for example using a register. The point at which the window is closed (i.e. the length of the window) may be variable. The point at which the window is closed (i.e. the length of the window) may be configurable, for example using a register.

Sync detection preferably takes place when the data is read from the data-holding medium, i.e. before any further processing is carried out on the data. The data reader may have one or more channels, and data may be read in the or each channel. When two or more channels are provided, sync detection is preferably carried out independently for each channel.

According to a second aspect of the invention, a data reader is arranged to read data from a data-holding medium, said data being arranged into a plurality of data items each containing user data and non-user data, with said non-user data including one or more synchronisation fields, said data reader having one or more read heads each reading data from the data-holding medium, and processing circuitry arranged to receive and process said data to detect at least one synchronisation field, said processing involving qualifying the detection of the synchronisation field to tolerate one or more errors therein.

The processing circuitry may be arranged to qualify detection of the synchronisation field (sync) by determining a part of the sync to be detected, and known as a sync pattern.

The processing circuitry may include one or more processing blocks whereby the sync detection may be qualified by determining that the sync pattern must be preceded by a predetermined pattern of data, such that sync detection is only enabled when the predetermined pattern of data is detected. The processing blocks may comprise one or more shift registers.

Additionally or alternatively, the processing circuitry may include one or more processing blocks whereby sync detection may be qualified by splitting the sync pattern into two or more portions or sync bytes, and determining that detection of one or more of the sync bytes constitutes detection of the sync pattern. The processing blocks may comprise one or more registers. The registers may be mask registers. The contents of the or each mask may be programmable, for example by firmware of the data reader.

Additionally or alternatively, the processing circuitry may include one or more processing blocks whereby the sync detection may be qualified by using a window and determining that any sync pattern or sync byte detected whilst the window is open is considered as a true sync pattern or sync byte, and a partial sync pattern or sync byte detected whilst the window is closed is considered a spurious sync pattern or sync byte, for example generated by errors in the data. If a complete sync pattern is detected outside the window it may be accepted. This is especially advantageous if the sync pattern is arranged such that it cannot occur in the data, and therefore if the complete pattern is detected it can be assumed to be accurate.

The processing blocks may include one or more registers. The point at which the window is opened may be configurable, for example using a register. The point at which the window is closed (i.e. the length of the window) may be configurable, for example using a register.

The data reader may include a plurality of read heads, each of which is arranged to read a separate channel of data in parallel with one another In the preferred embodiment the data reader comprises 8 read heads, although the data reader could comprise any number of read heads. For example the data reader may comprise 2,3,4,5,6,7,9,10,11,12,13,14, or more read heads. An advantage of providing multiple read heads is that the rate at which data can be read from the data holding medium is increased. When two or more channels are provided, sync detection is preferably carried out independently for each channel.

In one data format, each data item comprises two user data items, known as codeword pairs, with three synchronisation fields; a forward sync positioned before the first codeword pair, a resync positioned between the codeword pairs, and a back sync positioned after the second codeword pair.

With this format, in the first or the second aspects of the invention, the forward sync may be qualified by defining a sync pattern and/or by determining that it is preceded by a predetermined pattern of data, such as a VFO signal. The same will apply to the back sync (which would be followed by a predetermined pattern of data rather than preceded). The detection of any of these syncs may be qualified by defining a sync pattern and/or by splitting the sync pattern into two or more sync bytes and determining that detection of one or more of the sync bytes constitutes detection of the sync pattern. Detection of the resync may also be qualified by using a window, and determining that any resync pattern or resync byte detected while the window is open is considered as a true resync pattern or resync sync byte, and any resync pattern or resync byte detected while the window is closed is considered as a spurious resync pattern or resync sync byte.

According to a third aspect of the invention, we provide a data storage device incorporating a data reader according to the second aspect of the invention.

In the preferred embodiment the data storage device is a tape drive. Such a tape drive may be arranged to read data held in any of the following formats: LTO (Linear Tape Open), DAT (Digital Audio Tape), DLT (Digital Linear Tape), DDS (Digital Data Storage), or any other format, although in the preferred embodiment the tape is LTO format.

Alternatively, the data storage device may be any one of the following: CDROM drive, DVD ROM/RAM drive, magneto optical storage device, hard drive, floppy drive, or any other form of storage device suitable for storing digital data.

According to a fourth aspect of the invention there is provided a computer readable medium having stored therein instructions for causing a processing unit to execute the method of the first aspect of the invention.

The computer readable medium, although not limited to, may be any one of the following: a floppy disks a CDROM, a DVD ROM/RAM, a ZIP™ disk, a magneto optical disc, a hard drive, a transmitted signal (including an internet download, file transfer, etc.).

BRIEF DESCRIPTION OF THE DRAWINGS

An embodiment of the invention is described by way of example only in the accompanying drawings, in which.

DETAILED DESCRIPTION OF THE INVENTION

Figure 1:
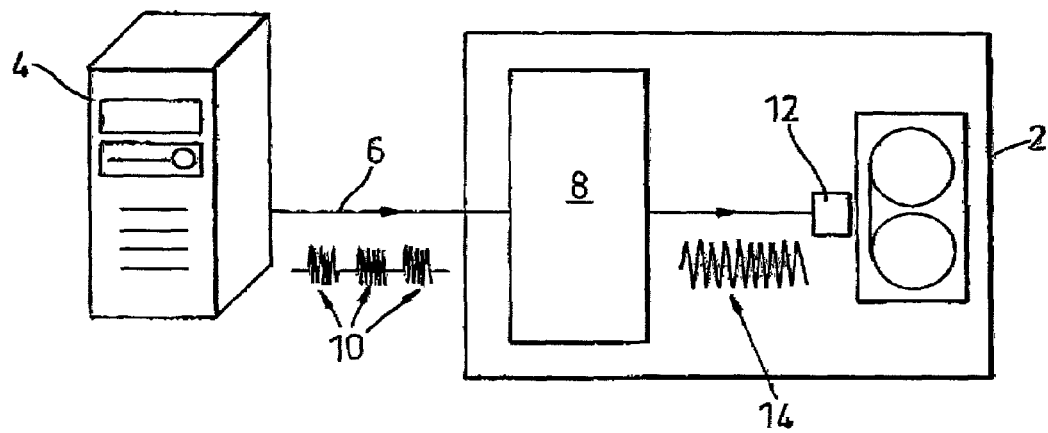
FIG. 1 is a schematic diagram of a computer connected to a tape drive according to the present invention.

Turning to FIG. 1 a tape drive 2 is shown connected to a computing device 4. The computing device 4 may be any device capable of outputting data in the required format to the tape drive 2, but would typically be a device such as a computer referred to as a PC, an APPLE MAC™, etc. These machines may run a variety of operating systems such as for example MICROSOFT WINDOWS™, UNIX, LINUX, MAC OS™, BEOS™. Generally, because of the high cost of the tape drive 2 it would be connected to a high value computer such as a network server running WINDOWS NT™ or UNIX.

A connection 6, in this case a SCSI link, is provided between the computing device 4 and the tape drive 2, which allows data to be transferred between the two devices in either direction. The tape drive 2 contains processing circuitry 8, which processes and controls data received from the computing device before passing this to the tape drive, and vice versa. A tape 10 is inserted into the tape drive 2 and is capable of having data written thereto and read therefrom by a set of write and read heads 12. In this embodiment there are eight write heads and eight read heads, to provide eight write and eight read channels. The tape drive corresponds to the LTO format and typically receives tapes having a capacity of the order of 100 Gbytes.

The processing circuitry further comprises memory in which data read from the tape is stored whilst it is being decoded, together with electronics that is arranged to read and decode data from the tape 10.

Data sent by such computing devices is generally sent in bursts, which results in data packets 13 of data that need to be smoothed in order that they can be sequentially recorded by the tape drive. Therefore, the buffer within the control circuitry 8 buffers these bursts and cause continuously data 14 to be written to the tape 10.

Figure 2:
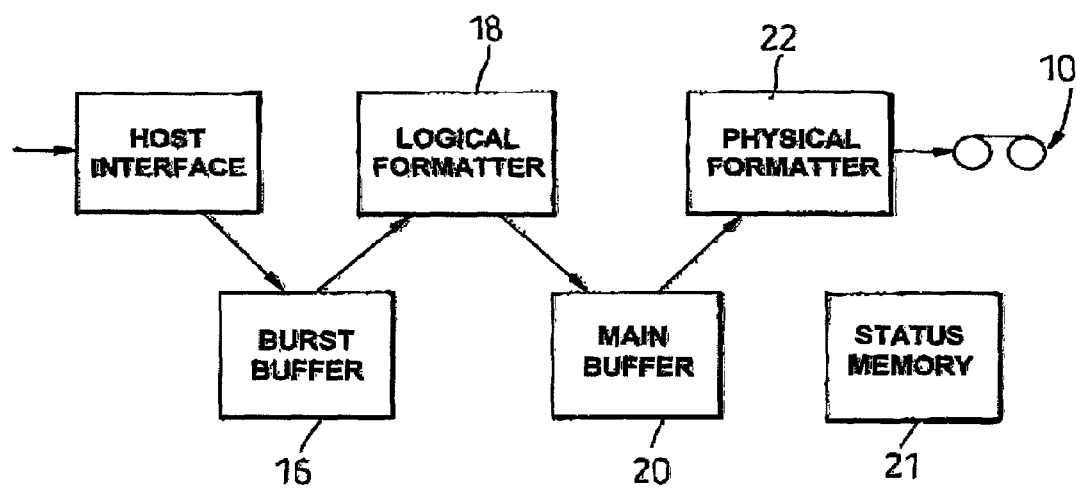
FIG. 2 is a schematic diagram showing the main components of the tape drive of FIG. 1.

The control circuitry is shown in more detail in FIG. 2, which shows a number of portions of the control circuitry 8. The computing device is represented by the left most box of the Figure. The control circuitry 8 comprises a burst buffer 16 that has a capacity of 128 Kbytes and is arranged to receive data from the computing device 4. A logical formatter 18 is provided to perform initial processing of the data received by the burst buffer 16. A main buffer 20 is provided having a capacity of 16 Mbytes and is arranged to hold data that is waiting to be written to the tape 10, and also holds data that is being read from the tape 10 before being sent to the computing device 4. The final block shown in FIG. 2 is the physical formatting block 22, which performs further processing on the data before it can be written to the tape 10, details of which will be given below.

Data received by the tape drive 2 from the computing device 4 is first passed to the burst buffer 16. The burst buffer 16 is required to ensure that the tape drive 2 can receive the high speed bursts of data sent by the computing device 4, which may otherwise be received too rapidly for the logical formatter 18 to process in time. The burst buffer 16 is of a First In First Out (FIFO) nature so that the order of the data is maintained as it is passed to the logical formatter 18.

The logical formatter 18 compresses the data received and arranges it into a first data structure described hereinafter. Once the data has been processed in this manner it is passed to the main buffer 20, also of a FIFO nature, to await further processing before being written to the tape 10. The capacity of the main buffer 20 is much greater than that of the burst buffer 16 so that it can act as a reservoir of information should data be received from the computing device 4 at too great a rate, and can be used to allow writing to continue should data transmission from the computing device 4 be suspended.

The physical formatter 22 handles the writing of the data to the tape, which includes read while writing retries (RWW retries), generation of first and second levels of error correction (C1 and C2), generation of headers, RLL modulation, sync. fields, and provides data recovery algorithms. These terms will be expanded upon hereinafter.

Figure 3:
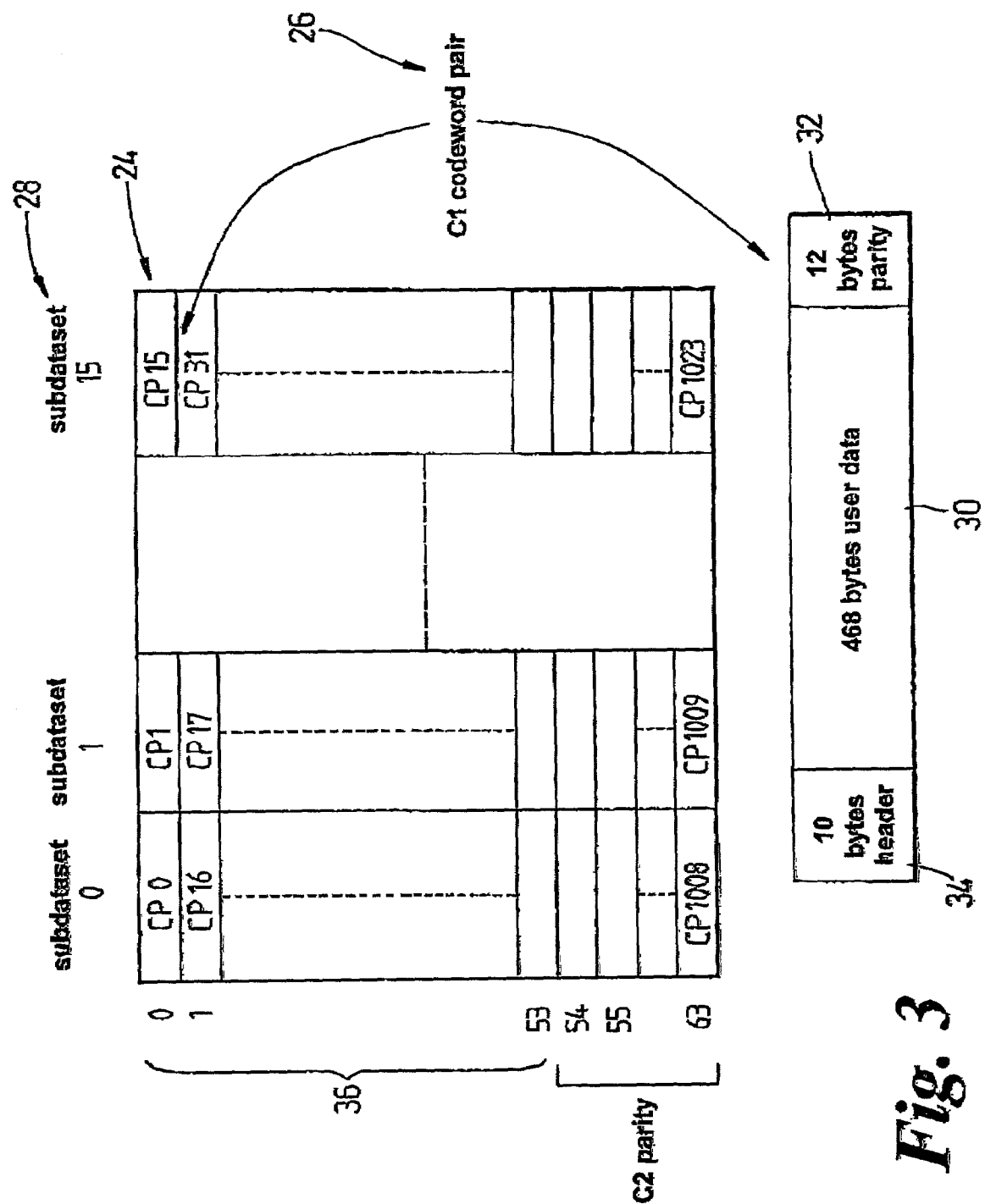
FIG. 3 shows the structure into which data received by the tape drive is arranged.

As written to the tape 10, the data is arranged in a data structure 24, or dataset, as shown in FIG. 3, details of which are as follows. The dataset typically holds 400 Kbytes of compressed data, and comprises a matrix of 64×16 C1 codeword pairs (CCP) 26 and there are therefore 1024 CCPs within a dataset. Each column of the matrix is referred to as a sub-dataset 28, and there are thus 16 sub-datasets within a dataset.

Each CCP, as its name suggests, comprises two code words, each containing 234 bytes of user data, together with 6 bytes of parity information (C1 error correction data), which allows the detection and correction of 3 bytes in error within any CCP. Therefore, each CCP comprises 468 bytes of user data 30 and 12 bytes of parity information 32. The CCP is also headed by a 10 byte header 34.

Rows zero to fifty-three 36 of the dataset 24 hold user data and C1 parity information. Rows fifty-four to sixty-three hold data providing the second level of error correction, C2 parity information.

Figure 4:
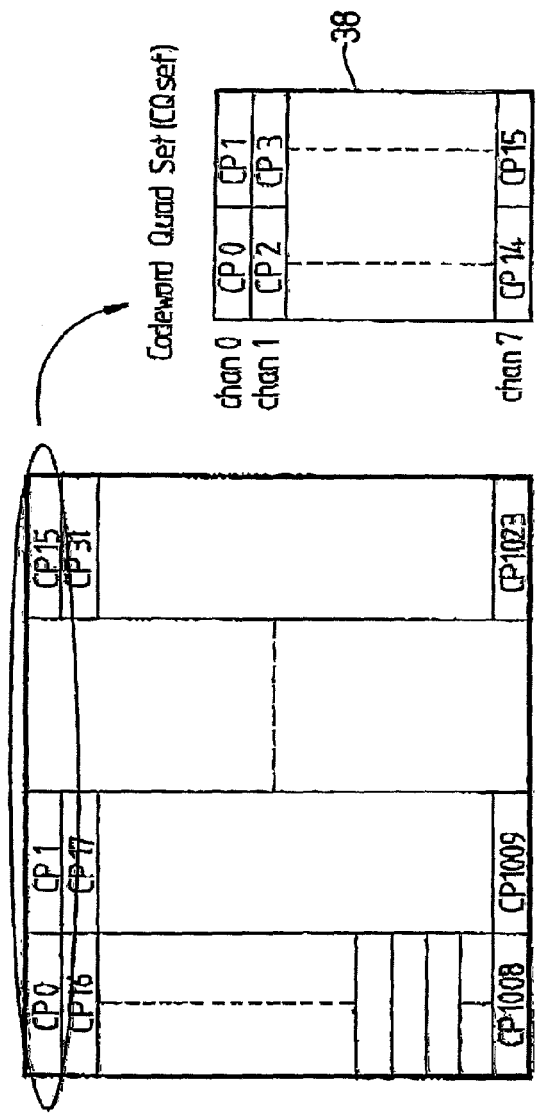
FIG. 4 shows further detail of the data structure of FIG. 3 and how the data is written to the tape.

In general, when the physical formatter 22 writes data to the tape 10 it writes the datasets 24 sequentially, each as a codeword quad set (CQ set) 38, as shown in FIG. 4. This shows that row zero is written first, then row one, up to row 63. Each row is written across all the write heads 12 (channel 0 to channel 7). Each CQ set 38 can be represented as a 2×8 matrix, with each cell of the matrix containing a CCP 26 from the dataset.

Each row of the 2×8 matrix is written by a separate write head 12, thus splitting the CQ set 38 across the tape 10.

Figure 5:
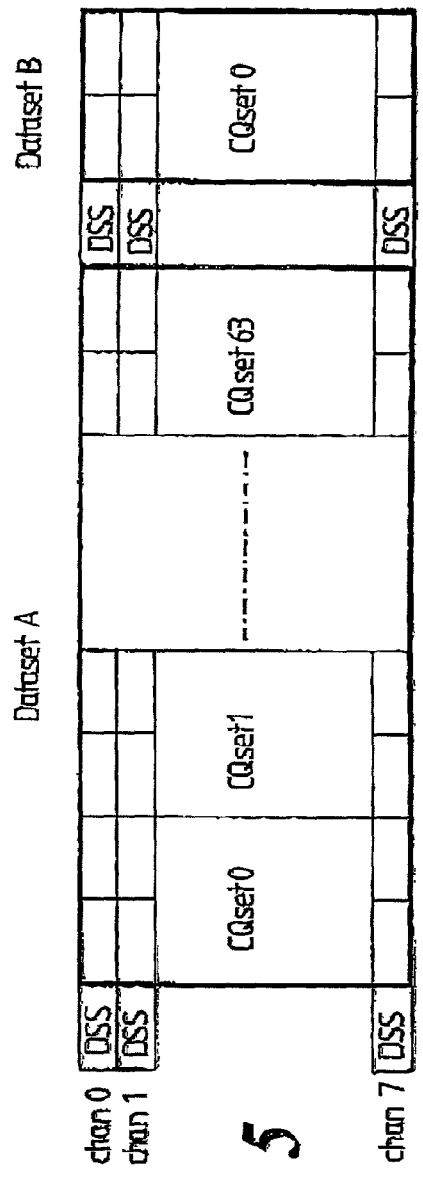
FIG. 5 shows further detail of the data structure of FIGS. 3 and 4, and shows the physical arrangement of the data on the tape.

Thus, the 1024 CCPs 26 from a dataset 24 are written as 64 CQ sets, as shown in FIG. 5. Between each dataset, a dataset separator (DSS) is recorded on the tape 10.

Figure 6:
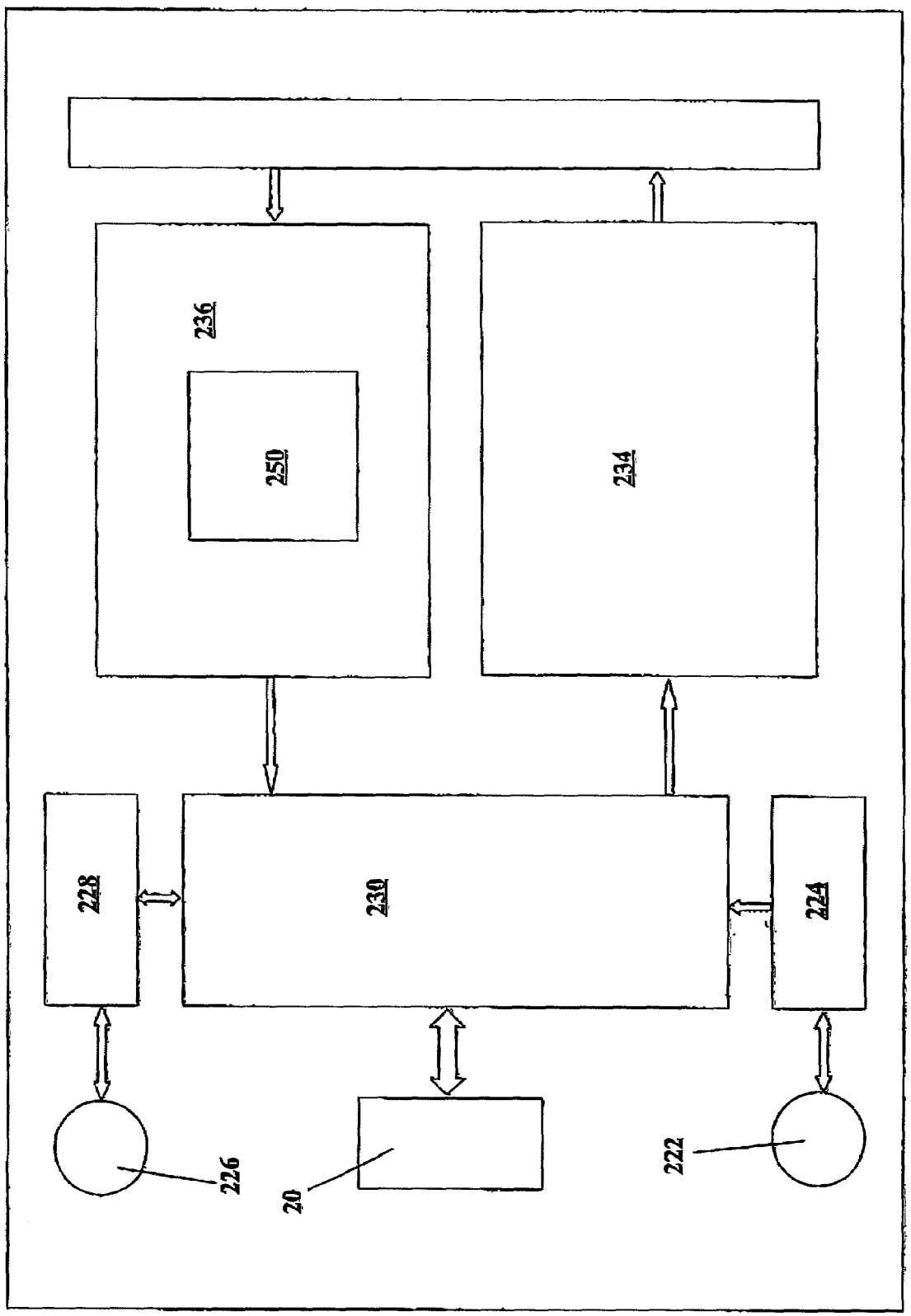
FIG. 6 is a schematic diagram of a formatter for the data.

The operation of the physical formatter 22 is shown in more detail in FIG. 6. The physical formatter 22 comprises the buffer 20, a write controller 222 controlling a write chain controller 224, and a read controller 226 controlling a read chain controller 228. The write chain controller and the read chain controller both interact with a function processing block 230, which generates the C1 and C2 parity bytes, sends data to a CCQ writer 234 for writing onto the tape channels, and receives data read from the tape channels by a CCQ reader 236. The physical formatter 22 is executed as hardware, with the exception of the write controller 222 and the read controller 226, which are firmware.

The write chain controller 224 operates the function block 230 to generate a CCP 26 from the data in the buffer 20, complete write C1 and C2 error correction information. The write chain controller 224 also generates the 10 header bytes 34, which are added by the function block 230.

The CCP 26 is then passed from the function block 230 to the CCQ writer 234, along with further information from the write chain controller 224, including whether it is the first or the second in a CQ set 38, and whether it should be preceded by a dataset separator DSS, and which channel (0 to 7) it should be written to.

The information in the header 34 is critical, and includes a designator of its position in the dataset matrix 24 (a number from 0 to 1023), a dataset number, a write pass number (to be explained in more detail below), an absolute CQ sequence number (all generated by the write chain controller 224), and two Reed Solomon header parity bytes, which are generated by the function block 230. These header parity bytes enable errors in the header 34 to be detected, but not necessarily corrected.

Figure 7:
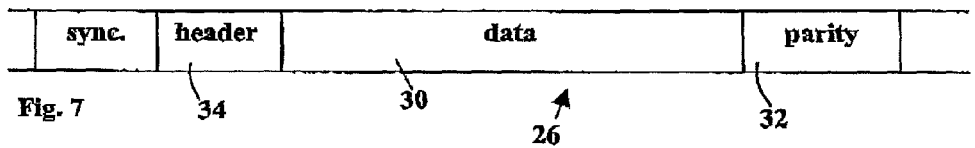
FIG. 7 shows more detail of data as written to tape.

The CCPs 26 passed to the CCQ writer 234 are allocated to a particular channel (0 to 7) Further processing adds synchronisation (sync) fields before each header 34 (see FIG. 7). This enables headers 34 to be recognised more easily when the data is read.

Figure 8:
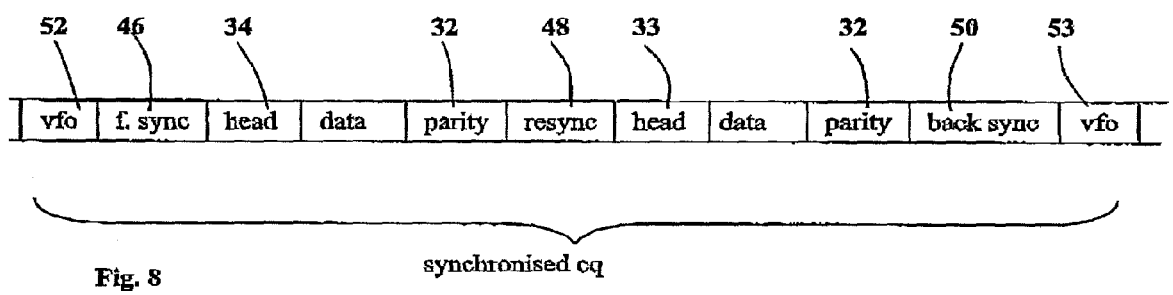
FIG. 8 shows further detail of data as written to tape.

As shown in FIG. 8 three separate sync fields are used: a forward sync 46, a resync 49 and a back sync 50. The forward sync 46 is positioned before the header 34 of the first CCP 26 of a CQ set 38. The resync 48 is positioned between the two CCPs 26 of a CQ set 38 (i.e. after the parity data 32 of the first CCP 26 and before the header 33 of the second CCP 26). The back sync 50 is positioned after the parity data 32 of the second codeword pair 26 within the CQ set 38 The syncs are each 24 bits long, and each has its own predetermined pattern.

The forward sync 46 is preceded by a VFO field 52 which comprises the data 000010 followed by a number of occurrences of the bit sequence 101010. The back sync field 50 is followed by a VFO field 53 that comprises the data 000010 followed by a number of occurrences of the bit sequence 101010. The VFO field 52 is easily detectable by the processing circuitry reading data from the tape 10, and alerts it to the fact a forward sync field 46 is to follow. The back sync 50 and VFO 53 are used in a similar way when the tape 10 is read backwards. The portion of the tape comprising a forward sync 46 to a back sync 50 comprises a synchronised CQ set 38. The headers 33, 34 contain information as to the identity of the data and the reading of the headers determines how the processing circuitry decodes the data. A DSS is put at the beginning of a dataset.

Figure 9:
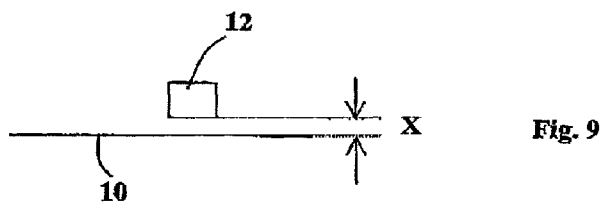
FIG. 9 shows schematically the position of a read head in relation to a tape.
Figure 10A:
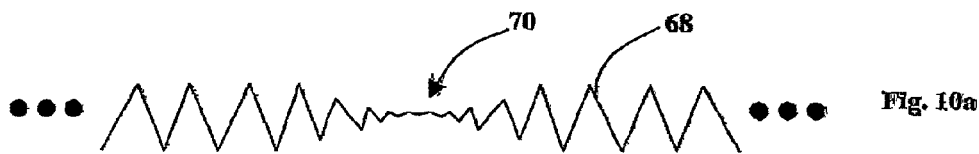
FIGS. 10*a* and *b* show schematically problems that may occur with a signal being read from a tape.

The dataset is then written to the tape 10 by the eight write heads 12 according to the channels (0 to 7) assigned by the write chain controller. When writing, the write pass number contained in the header 34 is of importance. As can be seen in FIG. 9, when writing data, the physical separation X between the write heads 12 and tape 10 can vary. If the write head 12 moved away from the tape 10 when data was being written (i.e. X increased), then when that data is read back the signal strength at the point corresponding to the increase in X during writing will be much weaker. This is represented in FIG. 10a in which the signal 68 is weakened in the region 70. Such regions are referred to as regions of drop-out The increased distance X can be caused by a number of factors, including the presence of dirt on the tape 10 and ripples in the tape 10.

Figure 10B:
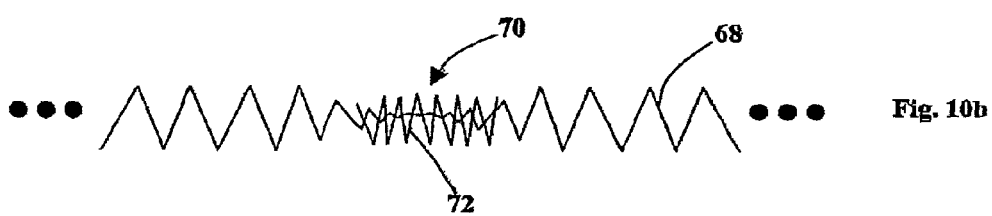

Whilst the tape 10 contains no information then a drop-out region 70 simply results in a loss of signal during reading, and would generate a read while writing retry (as explained below). However, if the tape 10 contained information that was being overwritten then because of the reduced field during writing the existing data would not be erased and would remain on the tape 10 and this is shown in FIG. 10; the new signal 68 is shown with a drop-out region 70 as in FIG. 10a, but an existing signal 72 remains in this drop-out region. This existing signal is referred to a region of drop-in.

Drop-in regions must be accounted for during reading of information from the tape 10, and the write pass number described above is used to achieve this. All data that is written to the tape 10 is written with a write pass number, which for a particular tape is incremented each time data is written thereto. Consequently, a drop-in region of existing signal 72 will have a lower write pass number than the newer signal 68 that surrounds it. If the write pass drops during the middle of a dataset as data is being read from the tape 10, this indicates that a region of drop-in has been encountered. The current write pass number is held in the CCQ reader 236.

The data being written to the tape 10 is also read by the eight read heads, The data read is passed to the CCQ reader 236, where it is processed as explained below, before being passed to the function block 230 for error detection and correction, and for checking by the read chain controller 228.

If the tape drive is in Read While Writing mode, the write chain controller 234 checks the CCPs to determine which CQ sets 38 are in error, and so need rewriting to the tape 10.

If the tape drive is in Reading mode, that is, for restoration of data, the CCPs 26 are passed to the buffer 20 to await sending back to the computer device 4.

The invention lies in sync detection. Detection of the syncs is critical for reliable data recovery. For example, if the forward sync contains errors which means that it is not detected, the following CCP will be missed. In addition, the patterns of the syncs may occur in random data, resulting in mis-interpretation of the subsequent data. The sync detection is therefore qualified to allow for such circumstances, and error tolerance in the sync detection is provided. In this embodiment the rules for sync detection are as follows, and are illustrated in the state machine illustrated with reference to FIG. 11. Before the sync detection is triggered the state machine rests in an "idle" state 500, and once triggered progresses to a "strict sniffing" state 502.

The pattern of the forward sync may be found in user data, and therefore detection of a forward sync on its own is not fully reliable. To qualify the forward sync detection, it is determined that this must be preceded by a VFO signal. Thus, as will be seen from the "1" in the brackets indicated at 504, the preferred route for leaving the "strict sniffing" state 502 is to move to a "vfo detected" state 506. The VFO field preceding a forward sync comprises the pattern 000010 followed by a number of occurrences of the bit sequence 101010. The data read from the tape 10 is passed, one bit at a time, into a shift register of the processing block 250. As each bit is read into the register, the contents thereof are compared with an ideal VFO field. A 36 bit sequence of the VFO field is looked for, and detection is strict i.e. no tolerance is allowed. Once a VFO field has been detected, forward sync detection is enabled. VFO detection may occur unexpectedly (due to errors or drop-ins) at any point in the reading of a CCP; if this occurs the VFO field is accepted and forward sync detection enabled.

Thus, once sync detection has been enabled, it is possible for the state machine to move from the "vfo detected" state 506 back to the "strict sniffing" state 502. The change of state can be triggered by any one of three conditions: found_sync_1, found_Sync2, or found_strict_rsync. These terms will be expanded upon hereinafter.

Forward sync detection is performed on 21 bits of the 24, and is further qualified by splitting these 21 bits, forming a sync pattern into two portions: 00001001010 and 0100010100. These are called sync bytes. Once forward sync detection has been enabled, only one of these two sync bytes needs to be detected for forward sync detection to be considered to have occurred, i.e. an error in one half or the other is tolerated. As will be seen from FIG. 11 detection of the first sync byte (found_sync1) or the second sync byte (found_sync2) allows the state machine to move from the "vfo detected" state 506 to the "strict sniffing" state 502. Forward sync detection is carried out using a mask register for each sync byte. The data is read into a register in the processing blocks 250, and the contents of this register is ANDed with the contents of each mask register. The result of this is compared to the AND of the contents of each mask register and a register containing an ideal forward sync. The contents of the first mask register (for the first sync byte) is set to 111111111110000000000, and the contents of the second mask register (for the second sync byte) is set to 000000000011111111111. Each bit in each mask register corresponds to a bit in the data, and determines whether or not that bit of data is compared with the ideal forward sync. A '1' in a mask register indicates that the corresponding bit in the detected forward sync is compared with the ideal forward sync. Thus the first mask register allows detection of the first sync byte and the second mask register allows detection of the second sync byte. The start of a CCP is flagged if a full forward sync pattern or one or other of the forward sync bytes is detected.

When reading backwards along the tape, a back sync and a portion of the VFO field 53 have the same 21-bit pattern as the forward sync pattern. Their detection is, therefore, treated in the same way, including VFO detection enabling their detection.

Resync detection is performed on 24 bits, which may be the resync itself, or a sync pattern comprising the last 21 bits of the resync plus the first three bits of the following header, which are always the same Resync detection is qualified by splitting the resync pattern into two portions: 010000000; and 010101010101010. These are called sync bytes. Resync detection is carried out using two mask registers for each sync byte. The data is read into a register in the processing block 250, and the contents of this register is ANDed with the contents of each mask register. The result of this is compared to the AND of the contents of each mask and a register containing an ideal resync pattern. The mask register for the first sync byte is set to 111111111000000000000000 The mask register for the second sync byte is set to 000000000111111111111111. A '1' in a mask register indicates that the corresponding bit in the data will be is compared with the ideal resync. Thus the first two mask registers allow detection of the first sync byte and the second two mask registers allow detection of the second sync byte. In this data format, the second sync byte is more robust than the first sync byte, since the latter may appear in normal data. The second resync sync byte is also chosen such that it never occurs in error-free data. Detection of a second resync sync byte is therefore allowed to override detection of a first resync sync byte. As can be seen from FIG. 11 detection of the whole resync pattern allows the state machine to move from the "vfo detected" state 506 to the "strict sniffing" state 502.

The resync detection is further qualified by using a resync window. The resync is expected to occur a calculable number of bits (5907) after the beginning of the previous header. The resync window is opened at this point and closed at a set number of bits thereafter. The point at which the window is opened and the length of the window are each set in a register. Any resync sync bytes detected whilst the window is open are considered as true resync sync bytes, and any resync sync bytes detected whilst the window is closed are considered as spurious resync sync bytes generated, for example, by the data. Once the window has been opened, only one of the two resync sync bytes needs to be detected for resync detection to be considered to have occurred, i.e. an error in one half or the other is tolerated.

The pattern of the resync pattern does not occur in error-free data and the likelihood of it occurring in corrupt data is small. Strict detection of a resync on its own is therefore reliable. If a resync is detected the start of a CCP is flagged. Detection of a strict resync during reading of a CCP will override reading of that CCP, and reading of a new CCP will be started.

If whilst in the "strict sniffing" state 502 a resync is detected then the state machine remains in this state, moving back to the same state via path 508, but restarting the CCP. If a forward sync is detected, the state machine moves, after a number of bits, from the "strict sniffing" state 502 to a "resync window" state 510, in which the resync window is opened to aid detection of the resync. It is possible to leave the "resync window" state 510 via three routes 512, 514, 516. The highest priority route is to move to the "vfo detected" state 506 via path 512, which occurs if a VFO field is detected whilst the window is open.

The second priority route is to move back to the "strict sniffing" state 502 via path 514. Path 514 is activated if the whole of the resync is detected while the window is open (found_strict_resync), the second byte of the resync is detected (found_resync2), or the window closes with nothing further being detected (window_closed). It will be appreciated that the window is closed a predetermined time after it is opened and that as discussed above the second byte of the resync is more robust than the first because it cannot occur in uncorrupted user data. Because the second byte of the resync is more robust than the first, if it is detected within the window, the second byte of the resync is accepted without further checking.

The third path from "resync window" state 510 is via path 516 to the "resync1 detected" state 518. As discussed above, if the second byte of the resync is detected within the open window it is accepted. However, if the first byte of the resync is encountered the state machine moves to the "resync 1 detected" state 518.

Once in the "resync 1 detected" state 518 the state machine remains there until either a VFO is detected, the resync is confirmed, or the window closes. If a VFO is detected then the state machine moves to the "vfo detected" state 506 via path 520. If the resync is confirmed, by either the complete resync being detected (found_strict_resync), or the second byte of the resync is detected in addition to the first then the state machine moves to the "strict sniffing" state 502. Should the resync remain unconfirmed because the detection window is closed then the state machine also moves to the "strict sniffing" state 502.

A CCP is started or restarted on entry to the "strict sniffing" state 502 (except from the 'idle' state) and on entry to the "resync1 detected" state.

This detection method enables the maximum number of forward syncs and resyncs to be captured reliably (while tolerating small errors) and therefore leads to more reliable detection of the CCPs, which increases the amount of data being read.

Figure 11:
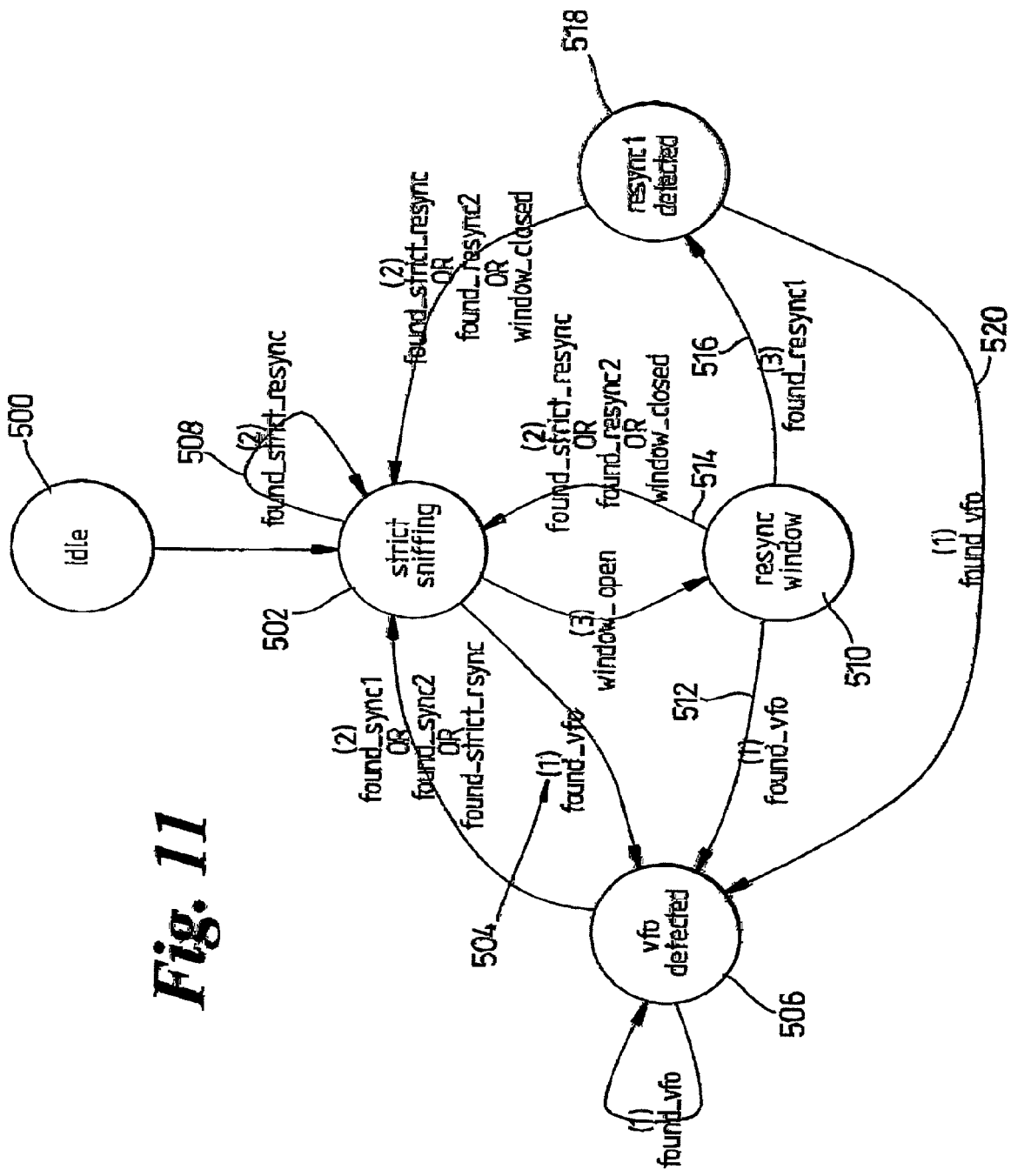
FIG. 11 illustrates the rules for sync detection in the data read from a tape inserted in the tape drive of FIG. 1.

For the ease of understanding of FIG. 11 the expansion of the terms used in the Figure is as follows:

| | |
|---|---|
| found_vfo: | vfo has been detected |
| found_sync1 | first sync byte detected |
| found_sync2 | second sync byte detected |
| found_resync1 | first resync byte detected |
| found_resync2 | second resync byte detected |
| found_strict_resync | strict resync detected |

We claim:

1. A method of reading data written on a data-holding medium using a data reader, said data being arranged into a plurality of data items, each including user data and non-user data, said non-user data including one or more synchronisation fields, said method comprising:
reading data from said data-holding medium; and
detecting at least one synchronisation field by processing said data, said processing including qualifying die detection of said synchronisation field to tolerate one or more errors therein, detection of said synchronisation field (sync) being qualified by determining a sync pattern formed by a part of said sync to be detected, wherein detection of said sync pattern is qualified by determining that said sync pattern must be preceded by a predetermined pattern of data, and enabling sync detection only in response to said predetermined pattern being detected, each data item including first and second codeword pairs forming two user data items, and a forward sync field positioned before said first codeword pair, a resync field positioned between said first and second codeword pairs, and a back sync field positioned after said second codeword pair, and detection of one of said forward sync fields or one of said back sync fields being qualified by determining that the forward or backward synchronization field must be preceded by a predetermined pattern of data.

2. A method according to claim 1, wherein detection of said predetermined pattern of data occurring at any point in the reading of the data is accepted and sync detection enabled.

3. A method according to claim 1, wherein detection of said predetermined pattern of data allows no errors in the detection thereof to be tolerated.

4. A method according to claim 1, wherein sync pattern detection is qualified by splitting said sync pattern into at least two sync bytes, and determining that said sync pattern has been detected by detecting at least one of said sync bytes.

5. A method according to claim 4, wherein said sync bytes are substantially adjacent on said data medium.

6. A method according to claim 1, wherein said sync pattern is split into first and second sync bytes, said first sync byte comprising a first portion of said sync pattern, and said second sync byte comprising the remainder of said sync pattern.

7. A method according to claim 6, wherein detection of said second sync byte is allowed to override detection of the first sync byte.

8. A method according to claim 1, wherein sync pattern detection is qualified by using a window and considering as a true sync pattern any sync pattern detected while the window is open, and considering as a spurious sync pattern any sync pattern detected while the window is closed.

9. A method according to claim 8, wherein said window is opened at a predetermined point.

10. A method according to claim 8, wherein said window is closed at a predetermined point after the point at which it is opened.

11. A method according to claim 9, wherein said point at which said window is opened is configurable.

12. A method according to claim 10, wherein said point at which said window is closed is configurable.

13. A method of reading data written on a data-holding medium using a data reader, said data being arranged into a plurality of data items, each including user data and non-user data, said non-user data including one or more synchronisation fields, said method comprising:
reading data from said data-holding medium; and
detecting at least one synchronisation field by processing said data, said processing including qualifying the detection of said synchronisation field to tolerate one or more errors therein, detection of said synchronisation field (sync) being qualified by determining a sync pattern formed by a part of said sync to be detected, wherein sync pattern detection is qualified by splitting said sync pattern into at least two sync bytes, and determining that said sync pattern has been detected by detecting at least one of said sync bytes, said sync bytes being configurable.

14. A method of reading data written on a data-holding medium using a data reader, said data being arranged into a plurality of data items, each including user data and non-user data, said non-user data including one or more synchronisation fields, said method comprising:
reading data from said data-holding medium; and
detecting at least one synchronisation field by processing said data, said processing including qualifying the detection of said synchronisation field to tolerate one or more errors therein, detection of said synchronisation field (sync) being qualified by determining a sync pattern formed by a part of said sync to be detected, wherein sync pattern detection is qualified by splitting said sync pattern into at least two sync bytes, and determining that said sync pattern has been detected by detecting at least one of said sync bytes, and detection of each said sync byte is carried out using at least one mask register.

15. A method according to claim 14, wherein detection of each said sync byte comprises reading data from said data-holding medium into a register, ANDing said contents of said register with said contents of each said mask register, and comparing the result thereof to the AND of the contents of each said mask register and a register containing an ideal sync pattern.

16. A method of reading data written on a data-holding medium using a data reader, said data being arranged into a plurality of data items, each including user data and non-user data, said non-user data including one or more synchronisation fields, said method comprising:
reading data from said data-holding medium; and
detecting at least one synchronisation field by processing said data, said processing including qualifying the detection of said synchronisation field to tolerate one or more errors therein, detection of said synchronisation field (sync) being qualified by determining a sync pattern formed by a part of said sync to be detected by splitting said sync pattern into at least two sync bytes, and determining that said sync pattern has been detected by detecting at least one of said sync bytes, each data item including first and second codeword pairs forming user data items, and a forward sync field positioned before said first codeword pair, a resync field positioned between said first and second codeword pairs, and a back sync field positioned after said second codeword pair, and qualifying detection of any of said sync patterns by splitting said sync pattern into two or more said sync bytes.

17. A method of reading data written on a data-holding medium using a data reader, said data being arranged into a plurality of data items, each including user data and non-user data, said non-user data including one or more synchronisation fields, said method comprising:
    reading data from said data-holding medium; and
    detecting at least one synchronisation field by processing said data, said processing including qualifying the detection of said synchronisation field to tolerate one or more errors therein, detection of said synchronisation field (sync) being qualified by determining a sync pattern formed by a part of said sync to be detected,
    wherein sync pattern detection is qualified by using a window and considering as a true sync pattern any sync pattern detected while the window is open, and considering as a spurious sync pattern any sync pattern detected while the window is closed, each data item including first and second codeword pairs forming user data items, and a forward sync field positioned before said first codeword pair, a resync field positioned between said first and second codeword pairs, and a back sync field positioned after said second codeword pair, and qualifying detection of a resync pattern using said window.

18. A method according to claim 17, wherein sync detection takes place when data is read from said data-holding medium, before any further processing is carried out on said data.

19. A method of reading data items on a storage medium including:
    (a) plural user data items;
    (b) a forward synchronization field positioned on the medium in the direction of forward reading before said plural user data items;
    (c) a back synchronization field positioned on the medium in the direction of forward reading after said plural user data items
    (d) a resynchronization field positioned on the medium between a pair of the user data items;
    (e) a predetermined pattern of the first non-user data positioned on the medium so the first non-user data precedes the forward synchronization field in the direction of forward reading; and
    (f) a predetermined pattern of second non-user data positioned on the medium so the second non-user data follows the back synchronization field in the direction of forward reading;
    the method comprising the steps of:
    moving the medium in the forward direction;
    while the medium is moving in the forward direction:
        (a) enabling reading of the forward synchronization field of a first of the plural data items in response to detection of the presence of the predetermined pattern of the first non-user data;
        (b) reading at least one of the user data items of the first data item in response to detection of the read, enabled forward synchronization field of the first data item;
        (c) enabling reading of the resynchronization field in response to detection of the presence of the predetermined pattern and after a predetermined time from a detection of the forward synchronization field, or determining that a resynchronization field has been read after reading of an error free resynchronization field; and
        (d) reading one of the user data items of the second data item in response to detection of the read, enabled resynchronization field of the second data item; and
    moving the medium in the backward direction;
    while the medium is moving in the backward direction:
        (a) enabling reading of the back synchronization field of a third of the plural data items in response to detection of the presence of the predetermined pattern of the second non-user data; and
        (b) reading at least one of the user data items of the second data item in response to detection of the read, enabled back synchronization field of the third data item.

20. A method of reading data items on a storage medium including:
    (a) plural user data items;
    (b) a forward synchronization field positioned on the medium in the direction of forward reading before said plural user data items;
    (c) a back synchronization field positioned on the medium in the direction of forward reading after said plural user data items;
    (d) a resynchronization field positioned on the medium between a pair of the user data items;
    (e) a predetermined pattern of the first non-user data positioned on the medium so the first non-user data precedes the forward synchronization field in the direction of forward reading; and
    (f) a predetermined pattern of second non-user data positioned on the medium so the second non-user data follows the back synchronization field in the direction of forward reading;
    the method comprising the steps of:
    moving the medium in the forward direction;
    while the medium is moving in the forward direction:
        (a) enabling reading of the forward synchronization field of a first of the plural data items in response to detection of the presence of the predetermined pattern of the first non-user data;
        (b) reading at least one of the user data items of the first data item in response to detection of the read, enabled forward synchronization field of the first data item
        (c) enabling reading of the resynchronization field in response to detection of the presence of the predetermined pattern and after a predetermined time from a detection of the forward synchronization field, or determining that a resynchronization field has been read after reading of an error free resynchronization field; and
        (d) reading one of the user data items of the second data item in response to detection of the read, enabled resynchronization field of the second data item.

21. A method of reading data items on a storage medium including plural data items each including user and non-user data, each of the plural data items including:
    (a) at least one user data item;
    (b) a forward synchronization field positioned on the medium in the direction of forward reading before said at least one user data item;
    (c) a back synchronization field positioned on the medium in the direction of forward reading after said at least one user data item;

(d) a predetermined pattern of the first non-user data positioned on the medium so the first non-user data precedes the forward synchronization field in the direction of forward reading; and
(e) a predetermined pattern of second non-user data positioned on the medium so the second non-user data follows the back synchronization field in the direction of forward reading the method comprising the steps of:

moving the medium in the forward direction;
while the medium is moving in the forward direction:
  (a) enabling reading of the forward synchronization field of a first of the plural data items in response to detection of the presence of the predetermined pattern of the first non-user data without interaction with any forward or backward synchronization fields of the medium; and
  (b) reading at least one of the user data items of the first data item in response to detection of the read, enabled forward synchronization field of the first data item; and
moving the medium in the backward direction;
while the medium is moving in the backward direction:
  (a) enabling reading of the back synchronization field of a third of the plural data items in response to detection of the presence of the predetermined pattern of the second non-user data without interaction with any forward or backward synchronization fields of the medium; and
  (b) reading at least one of the user data items of the second data item in response to detection of the read, enabled back synchronization field of the third data item.

22. A computer readable medium having stored therein instructions for causing a processing unit to execute the method of claim 19.

23. A storage device or computer readable medium having stored therein instructions for causing a processing unit to execute the method of claim 20.

24. A storage device or computer readable medium having stored therein instructions for causing a processing unit to execute the method of claim 21.

25. Apparatus for performing the method of claim 19.
26. Apparatus for performing the method of claim 20.
27. Apparatus for performing the method of claim 21.

* * * * *

UNITED STATES PATENT AND TRADEMARK OFFICE
CERTIFICATE OF CORRECTION

| | | |
|---|---|---|
| PATENT NO. | : 7,042,667 B2 | Page 1 of 1 |
| APPLICATION NO. | : 09/917952 | |
| DATED | : May 9, 2006 | |
| INVENTOR(S) | : Catharine Anne Maple et al. | |

It is certified that error appears in the above-identified patent and that said Letters Patent is hereby corrected as shown below:

On the face page, in field (73), under "Assignee", in column 1, line 2, after "L.P." insert -- , Houston, TX (US) --.

In column 2, line 15, delete "Ion" and insert -- In --, therefor.

In column 5, line 39, delete "cause continuously" and insert -- causes continuous --, therefor.

In column 7, line 20, delete "49" and insert -- 48 --, therefor.

In column 8, line 64, delete "found_sync_1, found_Sync2," and insert -- found_sync1, found_sync2, --, therefor.

In column 9, line 19, delete "00000000001111111111." and insert -- 00000000001111111111. --, therefor.

In column 11, line 20, in Claim 1, delete "die" and insert -- the --, therefor.

In column 13, line 42, in Claim 19, after "items" insert -- ; --.

In column 13, line 60, in Claim 19, delete "(b)reading" and insert -- (b) reading --, therefor.

In column 14, line 47, in Claim 20, after "item" insert -- ; --.

Signed and Sealed this

Sixteenth Day of November, 2010

David J. Kappos
*Director of the United States Patent and Trademark Office*